US009606866B2

(12) United States Patent
Taranta, II

(10) Patent No.: US 9,606,866 B2
(45) Date of Patent: *Mar. 28, 2017

(54) METHOD OF, AND APPARATUS FOR, IMPROVED DATA RECOVERY IN A STORAGE SYSTEM

(71) Applicant: Xyratex Technology Limited, Havant, Hampshire (GB)

(72) Inventor: Eugene Mathew Taranta, II, Casselberry, FL (US)

(73) Assignee: XYRATEX TECHNOLOGY LIMITED, Havant (GB)

( * ) Notice: Subject to any disclaimer, the term of this patent is extended or adjusted under 35 U.S.C. 154(b) by 300 days.

This patent is subject to a terminal disclaimer.

(21) Appl. No.: 14/221,117

(22) Filed: Mar. 20, 2014

(65) Prior Publication Data

US 2015/0269023 A1    Sep. 24, 2015

(51) Int. Cl.
*G06F 11/10* (2006.01)
*G06F 11/00* (2006.01)

(52) U.S. Cl.
CPC ...... *G06F 11/1076* (2013.01); *G06F 11/1092* (2013.01)

(58) Field of Classification Search
None
See application file for complete search history.

(56) References Cited

U.S. PATENT DOCUMENTS

2009/0204846 A1  8/2009  Baloun et al.

FOREIGN PATENT DOCUMENTS

WO   WO2014016860   1/2014

OTHER PUBLICATIONS

Fragalla, John, Improving Lustre OST Performance with ClusterStor GridRAID, Feb. 4, 2014, HPC Advisory Council Stanford Conference and Exascale Workshop 2014, http://www.hpcadvisorycouncil.com/events/2014/stanford-workshop/presentations/day2/4_Xyratex.pdf, slides 5-11.*
Fragalla, "Improving Lustre OST Performance with ClusterStor GridRAID", Feb. 7, 2014.

(Continued)

*Primary Examiner* — Justin R Knapp
(74) *Attorney, Agent, or Firm* — Hollingsworth Davis, LLC

(57) ABSTRACT

Method of defining a layout mapping function for a parity distributed RAID array including target objects, the layout mapping function defining the mapping of the stripe group-address space to the target-address space in the array and including a matrix defining a unit space across target objects, the matrix includes columns defining the objects and rows defining equally-offset sequential units on the objects, the method including: specifying P target objects, where P>1; b) specifying A target objects as spare space, where A<P and A≥1; defining a sub-matrix of P' columns, where P'=P−A; defining a layout of stripe groups across the P' target objects in the sub-matrix, each stripe group comprising data units and parity units; adding A columns, representative of the A spare space target objects, to the sub-matrix to form a complete matrix defining the layout mapping function; and implementing the layout mapping function on the objects.

26 Claims, 10 Drawing Sheets

(56) References Cited

OTHER PUBLICATIONS

Holland, "On-line data reconstruction in redundant disk arrays", Jan. 1, 1994.
Merchant et al., "Design and modeling of clustered RAID", Proceedings of the International Symposium on Fault Tolerant Computing (FTCS), Boston, Jul. 8-10, 1992, IEEE Comp. Soc. Press, vol. Symp. 22, Jul. 8, 1992, pp. 140-149.
Thomasian et al., "RAID5 Performance with Distributed Sparing", IEEE Transactions on Parallel and Distributed Systems, vol. 8, No. 6, Jun. 1, 1997, pp. 640-657.
European Search Report dated Nov. 20, 2015 from European Application No. 14170169.8, 11 pages.
David A. Patterson et al., "A Case of Redundant Arrays of Inexpensive Disks (RAID)," University of California, Berkley, pp. 109-116, ACM SIGMOD Conference (1988).
Arif Merchant et al., "Analytic Modeling of Clustered RAID with Mapping Based on Nearly Random Permutation," IEEE Transaction on Computers, vol. 45, No. 3, pp. 367373 (Mar. 1996).
Mark Calvin Holland, "On-Line Data Reconstruction in Redundant Disk Arrays," PhD. Thesis, Carnegie Mellon University, pp. Title-240 (1994).

* cited by examiner

METHOD OF, AND APPARATUS FOR, IMPROVED DATA RECOVERY IN A STORAGE SYSTEM

The present invention relates to a method of, and apparatus for, improved data recovery in a storage system.

Performance and data integrity are core requirements for modern storage systems. The ability to prevent and, if necessary, identify and correct data errors and corruptions is essential for operation of storage systems ranging from a simple hard disk drive up to large mainframe storage arrays.

One approach to improve the reliability and performance of a hard disk drive storage system is to employ redundant arrays of inexpensive disk (RAID). Indeed, RAID arrays are the primary storage architecture for large, networked computer storage systems.

The RAID architecture was first disclosed in "A Case for Redundant Arrays of Inexpensive Disks (RAID)", Patterson, Gibson, and Katz (University of California, Berkeley). RAID architecture combines multiple small, inexpensive disk drives into an array of disk drives that yields performance exceeding that of a single large drive.

There are a number of different RAID architectures, designated as RAID-1 through RAID-6. Each architecture offers disk fault-tolerance and offers different trade-offs in terms of features and performance. In addition to the different architectures, a non-redundant array of disk drives is referred to as a RAID-0 array. RAID controllers provide data integrity through redundant data mechanisms, high speed through streamlined algorithms, and accessibility to stored data for users and administrators.

RAID architecture provides data redundancy in two basic forms: mirroring (RAID 1) and parity (RAID 3, 4, 5 and 6). The implementation of mirroring in RAID 1 architectures involves creating an identical image of the data on a primary disk on a secondary disk. The contents of the primary and secondary disks in the array are identical. RAID 1 architecture requires at least two drives and has increased reliability when compared to a single disk.

RAID 3, 4, 5, or 6 architectures generally utilise three or more disks of identical capacity. In RAID 3 or 4 architectures, two or more of the disks are utilised for reading/writing of data and one or more of the disks store parity information. RAID 5 and 6 architectures comprise "distributed parity" architectures in which the data and parity data are interleaved across the disks.

Data interleaving across the disks is usually in the form of data "striping" in which the data to be stored is broken down into stripe groups comprising a plurality of blocks called "stripe units". The "stripe units" are then distributed across the disks.

Therefore, should one of the disks in a RAID group fail or become corrupted, the missing data can be recreated from the data on the other disks. The data may be reconstructed through the use of the redundant "stripe units" stored on the remaining disks. RAID 5 and 6 arrangements are particularly robust with regard to drive failure.

FIG. 1 shows a plurality of disk drives 10$a$-$e$ forming a RAID 6 array 12. In FIG. 1, five drives are shown. However, any suitable number could be used. Each disk drive 10$a$-$e$ can be accessed through a RAID controller to read/write data.

As shown in FIG. 1, data is stored on the RAID 6 array 108 in the form of stripe groups comprising stripe units. Each stripe group A, B comprises five separate stripe units— stripe A comprises stripes A1, A2, A3, $A_p$ and $A_q$. Stripe B comprises stripe units B1, B2, B3, $B_p$ and $B_q$. Therefore, the stripe units comprising each stripe (A1-A3 or B1-B3 respectively) are distributed across a plurality of disk drives, together with parity information $A_p$ and $A_q$ and $B_p$ and $B_q$ respectively. This provides data redundancy.

The arrangement, format, parameters and configuration of the particular stripe units across the drives of a RAID array is known as the layout. The layout may include, non-exhaustively, RAID array configuration parameters such as: information on the distribution of particular stripe groups, the number and size of the stripe units within those stripe groups, the size of the checksum symbols etc.

As shown in FIG. 1, each stripe unit in a stripe group is mapped to a different storage component in the array as a contiguous chunk of data. To map each stripe unit to a disk storage component creates two desirable properties. Firstly, most common I/O workloads can be parallelised across the storage components 10$a$-$e$ forming the RAID array 12. Secondly, should a storage component fail, only one stripe unit in a stripe group will affected, aiding recovery.

Some stripe units in a stripe group will store data whereas others will store redundancy (checksum) parity information. Further, some implementations may reserve stripe units as distributed spare space inside of the RAID array for the purpose of accelerated recovery from storage component failure.

How the data and parity information stripe units are distributed across the drives in an array is a function of the particular RAID software and is known as the unit mapping strategy. There are numerous strategies for how to layout data. In many cases, the layout is selected to eliminate areas of particularly high activity on the array and maximise performance of the array.

However, an issue can arise during recovery of a failed drive in a RAID array having a conventional distribution of stripe units such as shown in FIG. 1. Assuming that each drive is equally loaded, a drive failure may double the load on each surviving drive, leading to significant performance degradation during recovery.

A known technique to mitigate this issue is parity declustering. Parity declustered RAID (PDRAID) is a technique which, in the event of a drive failure, reduces the amount of work for each surviving drive. An example of this is described in *"Analytic modelling of clustered RAID with mapping based on nearly random permutation."*, Merchant, Arif, and Philip S. Yu, Computers, IEEE Transactions on 45.3 (1996): 367-373.

Merchant and Yu's approach is to combine stripe groups into small matrix layouts. An example of such a matrix is shown in FIG. 2. Each matrix is arranged such that the number of columns is equal to the number of hard drives in the array (i.e. the drive count). The columns are then divided into rows of equally offset units across those hard drives. A unit is a fixed width block of contiguously addressed information that is measured in bytes. Units are analogous to chunks and in PDRAID all units are of equal length. In practice, the unit size is equal to the chunk size of the array.

Units may contain data or parity information, or may be reserved as sparing space. The set of all units in a configuration are enumerated and ordered; this set is referred to as the unit-address space. A configuration containing U units is as follows: unit-address space={0, 1, 2, . . . U−1}.

A further criterion imposed is that the final stripe-group ends on the last drive. The number of rows in the matrix is then the least common multiple of the drive count and the stripe width, divided by the drive count.

FIG. 2 shows an exemplary matrix illustrating an arrangement comprising 15 hard drives. The data is arranged in a plurality of stripe groups. Each stripe group has a stripe width equal to the total number of units in the stripe group. In the example of FIG. 2, the stripe groups are arranged in a 5+2 configuration, meaning that for every stripe group there are 5 data units and 2 parity units.

The example of FIG. 2 is comprised of 15 stripe-groups and is the minimum number of stripe-groups that a) spans all drives and b) ends on a row boundary (the last 'Q' unit of stripe group 14 lands on the last drive). Because stripe-groups are mapped sequentially over the matrix space, it is ensured that each unit in a stripe-group maps to a different hard drive. Therefore, if any one hard drive fails, then at most one unit in any stripe-group is lost.

It is possible to utilise different layouts within a matrix as described, whilst maintaining the benefits of the above system. First referring back to FIG. 2, it is noted that each unit in the first column belongs to a different stripe group.

Therefore, it is safe to permute columns of the matrix without fear of landing two units of the same stripe group onto the same hard drive. In other words, each column is pseudo-randomly assigned to a particular drive such that the sequence of data down each column (i.e. on any given hard drive) remains the same, but that the particular hard drive to which that data sequence is assigned can be varied according to a pseudo-random computation.

FIG. 3 shows an alternative matrix layout utilising this approach. In a full configuration, each matrix is permuted uniquely according to a pseudo-random permutation selection procedure.

A number of rules exist which place certain bounds on the layout of a RAID array. One example of this is known as the layout goodness criteria as set out in "*On-Line Data Reconstruction In Redundant Disk Arrays*", PhD thesis, M. C. Holland, Carnegie Mellon University (1994).

These criteria are the single failure correcting, distributed recovery workload, distributed parity, computationally efficient mapping, large write optimized, and maximized parallelisation criteria. However, whilst these known arrangements are practical solutions to parity declustered layouts, they can pose issues during recovery after data loss, corruption or drive failure.

When a drive in a RAID array fails, the time required to repair the RAID array, e.g. to rebuild the lost data on a spare hot drive, is critical. Therefore, the mean time to repair (MTTR) is an important reliability metric of a RAID-based storage system.

A faster recovery time means that a storage system can tolerate a higher frequency of failures. As a result, the overall mean time to failure (MTTF) is also improved. MTTR is affected directly by repair performance and is comprised, in part, of disk access throughput, storage-bus bandwidth, and computational complexity (e.g. encode-decode logic, RAID logic, etc). Therefore, drive performance during recovery is critical to achieving a short MTTR.

However, in a well-structured PDRAID array, data lost due to a drive failure can be repaired at a rate beyond that of the maximum bandwidth of any one drive. Therefore, hot spare drives can form a bottleneck in a repair process.

A known approach to overcome this limitation is to distribute spare space throughout an array so that reconstructed data can be written across all surviving drives at a much higher rate.

However, whilst distributed sparing schemes have been devised for known PDRAID algorithms, no known method is presently available to address a nearly random permutation with efficiently distributed spare space.

Therefore, the present invention acknowledges, for the first time, that known PDRAID configurations are incapable of providing a data configuration in which spare space is distributed efficiently in a nearly random permutation configuration to aid reconstruction and recovery. Embodiments of the present invention seek to address this issue.

According to a first aspect of the present invention, there is provided a method of defining a layout mapping function for a parity distributed RAID array comprising a plurality of target objects, the layout mapping function defining the mapping of the group-address space to the target-address space in the array and comprising a matrix defining a unit space across a plurality of target objects, the matrix comprises columns defining said target objects and rows defining equally-offset sequential units on said target objects, the method comprising: a) specifying, on a computing apparatus, P target objects, where P>1; b) specifying, on a computing apparatus, A target objects as spare space, where A<P and A≥1; c) defining, on a computing apparatus, a sub-matrix of P' columns, where P'=P−A; d) defining, on a computing apparatus, a layout of stripe groups across the P' target objects in said sub-matrix, each stripe group comprising a plurality of data units and a plurality of parity units; e) adding, on a computing apparatus, A columns, representative of said A spare space target objects, to said sub-matrix to form a complete matrix defining said layout mapping function; and f) implementing, on a computing apparatus, said layout mapping function on said target objects of said RAID array.

In one embodiment, prior to step f), the method further comprises: g) permuting the columns of said complete matrix to assign different columns to different target objects. In one embodiment, in step g) said permutation involves pseudo-random permutation.

In one embodiment, step g) comprises providing a mapping between the permuted logical target addresses and said physical target addresses representative of said target objects.

In one embodiment, a plurality of target objects are allocated as spare space such that A>1.

In one embodiment, said target objects allocated as spare space are prioritised such that the target object having the highest priority is used first in the event of a failure.

In one embodiment, in the event of a failure of a target object, the method further comprises: g) copying data in the column corresponding to said failed target object to one of said A columns corresponding to spare space.

In one embodiment, subsequent to a failure of a target object, the method comprises: h) replacing said failed target object with a replacement target object, the replacement target object being associated with one of said P' columns; and i) copying data from said one of A columns corresponding to spare space to said one of P' columns associated with the replacement target object.

In one embodiment, step d) further comprises defining a pattern comprising a plurality of stripe groups and repeating said pattern across said sub-matrix.

In one embodiment, said pattern is defined by a width parameter, said width parameter specifying the number of stripe groups to be distributed across said columns of said matrix before said pattern is repeated. In one embodiment, said width parameter is greater than 1.

In one embodiment, said width parameter is selected as the integer of the number of target objects divided by the number of units in a stripe group.

In one embodiment, said pattern is defined by a repeat parameter, said repeat parameter specifying the number of stripe groups to be distributed sequentially down said rows of said matrix before said pattern is repeated. In one embodiment, said repeat parameter is greater than 1.

In one embodiment, said target objects comprise hard drives forming part of a RAID array.

According to a second aspect of the present invention, there is provided a computing apparatus comprising a physical processor, said computing apparatus being operable to define a layout mapping function for a parity distributed RAID array comprising a plurality of target objects, the layout mapping function defining the mapping of the group-address space to the target-address space in the array and comprising a matrix defining a unit space across a plurality of target objects, the matrix comprises columns defining said target objects and rows defining equally-offset sequential units on said target objects, the computing apparatus being operable to: a) specify P target objects, where P>1; b) specify A target objects as spare space, where A<P and A≥1; c) define a sub-matrix of P' columns, where P'=P−A; d) define a layout of stripe groups across the P' target objects in said sub-matrix, each stripe group comprising a plurality of data units and a plurality of parity units; e) add A columns, representative of said A spare space target objects, to said sub-matrix to form a complete matrix defining said layout mapping function; and f) implement said layout mapping function on said target objects of said RAID array.

In one embodiment, the computing apparatus is further operable to g) permute the columns of said complete matrix to assign different columns to different target objects. In one embodiment, said permutation involves pseudo-random permutation.

In one embodiment, said permutation further comprises providing a mapping between the permuted logical target addresses and said physical target addresses representative of said target objects.

In one embodiment, a plurality of target objects are allocated as spare space such that A>1.

In one embodiment, step d) further comprises defining a pattern comprising a plurality of stripe groups and repeating said pattern across said sub-matrix.

In one embodiment, said pattern is defined by a width parameter, said width parameter specifying the number of stripe groups to be distributed across said columns of said matrix before said pattern is repeated. In one embodiment, said width parameter is greater than 1.

In one embodiment, said pattern is defined by a repeat parameter, said repeat parameter specifying the number of stripe groups to be distributed sequentially down said rows of said matrix before said pattern is repeated. In one embodiment, said repeat parameter is greater than 1.

In one embodiment, in the event of a failure of a target object, the computing apparatus is further operable to: h) copy data in the column corresponding to said failed target object to one of said A columns corresponding to spare space.

In one embodiment, subsequent to a failure of a target object, said failed target object is replaced with a replacement target object and the computing apparatus is further operable to: i) associate the replacement target object with one of said P' columns; and j) copy data from said one of A columns corresponding to spare space to said one of P' columns associated with the replacement target object.

In one embodiment, said target objects comprise hard drives forming part of the RAID array.

According to a third aspect of the present invention, there is provided a parity distributed storage array comprising a plurality of storage devices arranged in a RAID array and the computing apparatus of the second aspect.

According to a fourth aspect of the present invention, there is provided a parity distributed storage array comprising a plurality of storage devices arranged in a RAID array, said RAID array being configured in accordance with the method of the first aspect.

According to a fifth aspect of the present invention, there is provided a non-transitory computer readable storage medium having stored thereon a computer program product executable by a programmable processing apparatus, comprising one or more software portions for performing the steps of the first aspect.

Embodiments of the present invention will now be described in detail with reference to the accompanying drawings, in which:

FIG. 6 is a schematic diagram showing a sub-matrix arrangement illustrating the data layout on a RAID array in accordance with an embodiment of the present invention;

FIG. 7 is a schematic diagram showing a complete matrix arrangement illustrating the data layout on a RAID array in accordance with an embodiment of the present invention;

FIG. 8 is a schematic diagram showing the matrix arrangement of FIG. 7 after a permutation operation in accordance with an embodiment of the present invention;

FIG. 11 is a schematic diagram showing a yet further alternative sub-matrix arrangement illustrating the data layout on a RAID array in accordance with an embodiment of the present invention;

FIG. 12 is a schematic diagram showing a complete matrix arrangement formed from the sub-matrix of FIG. 11.

Figure 13:
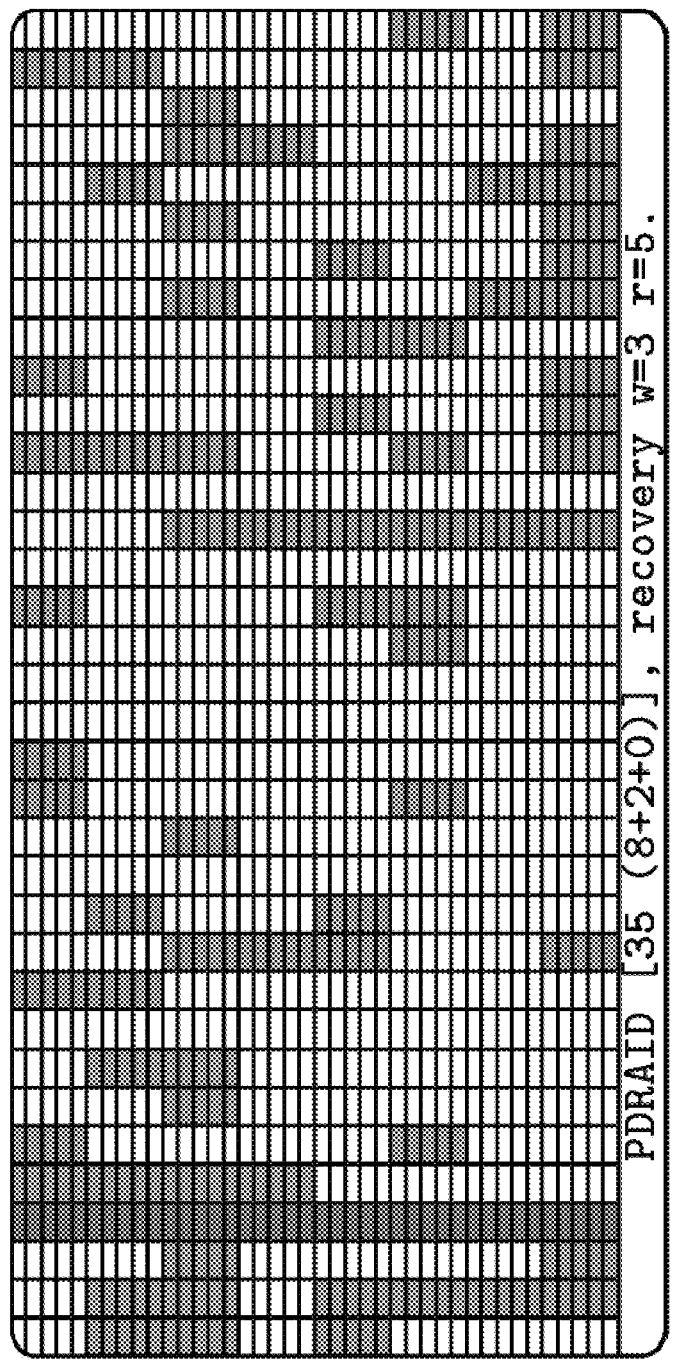
Figure 14:
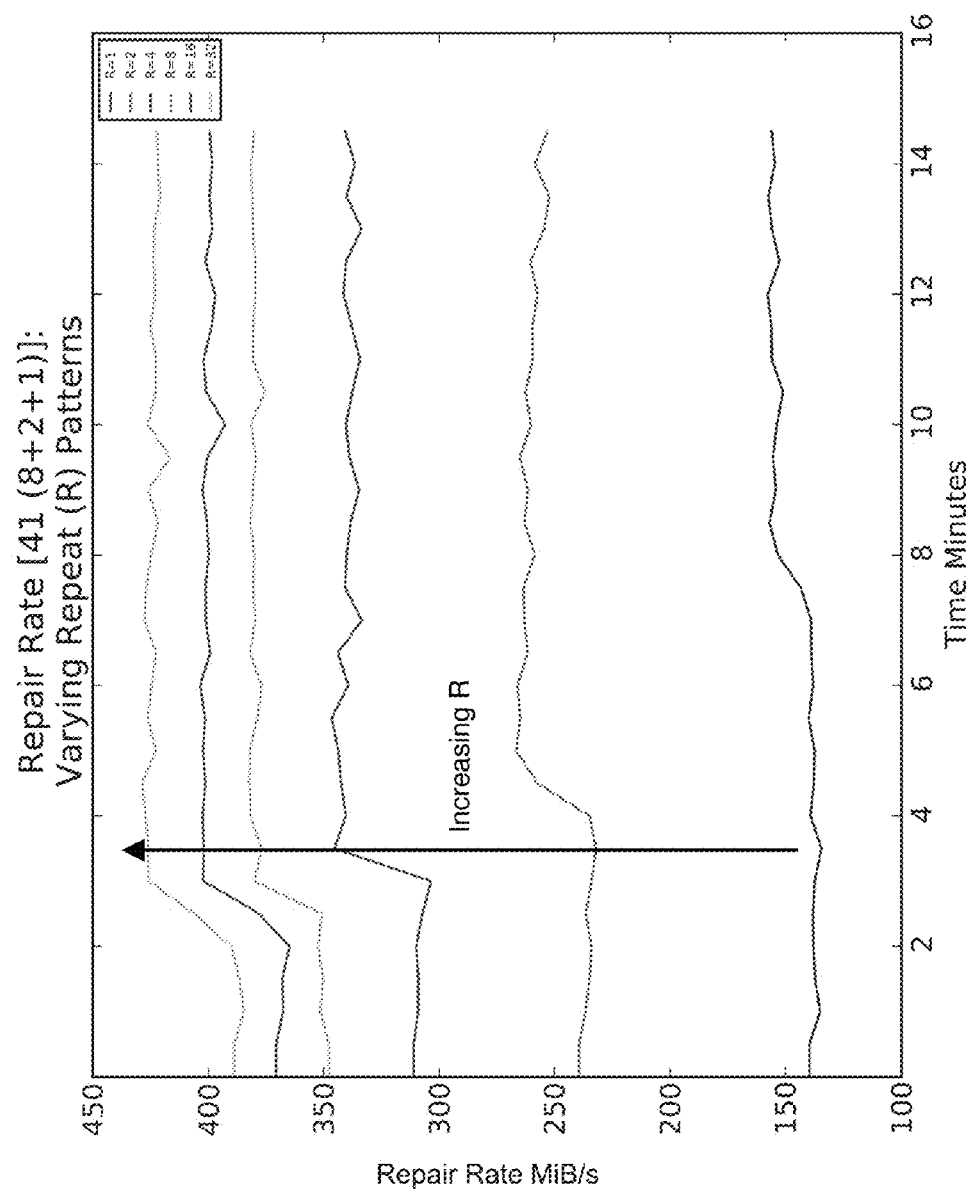
Figure 15:
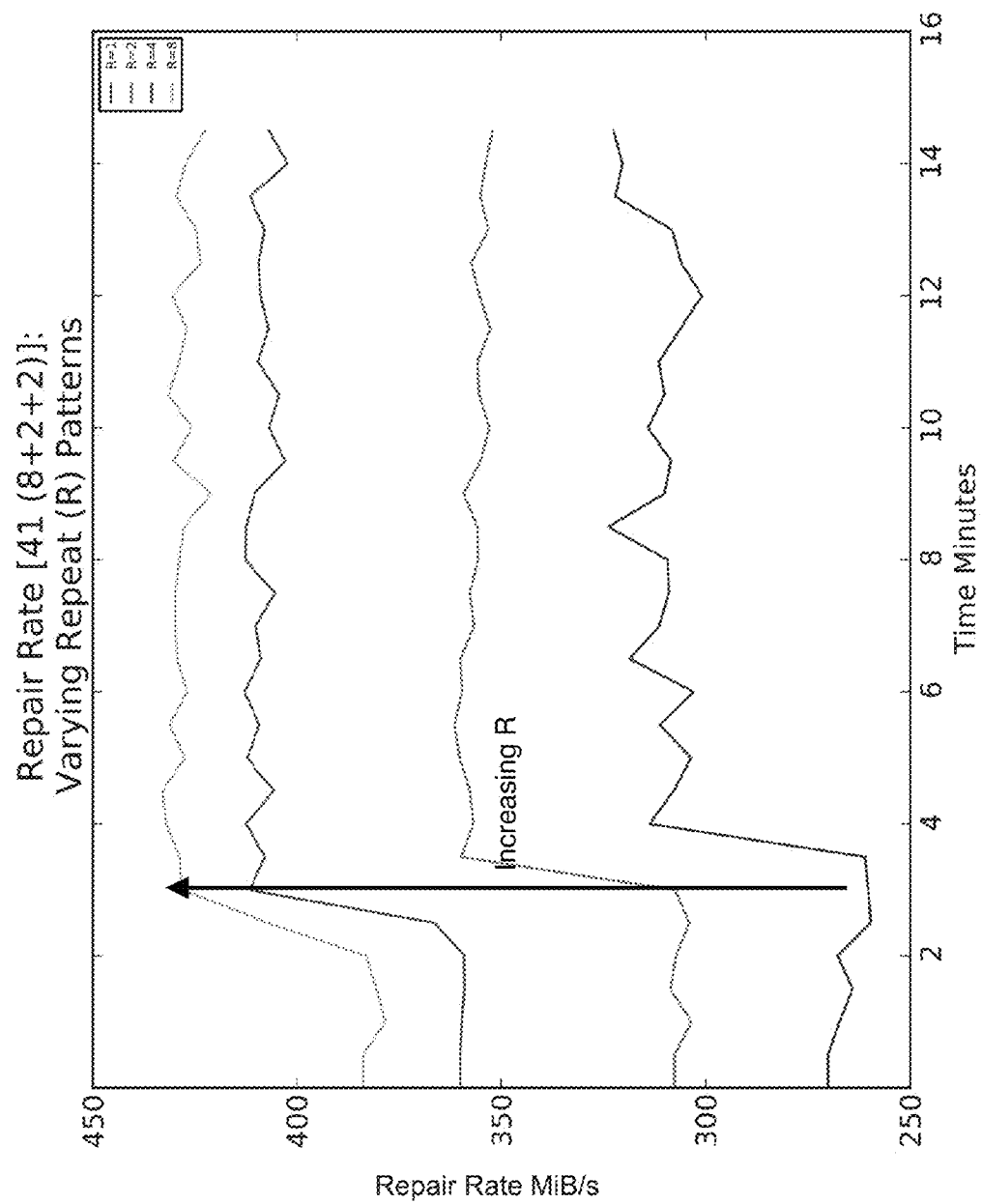
Figure 16:
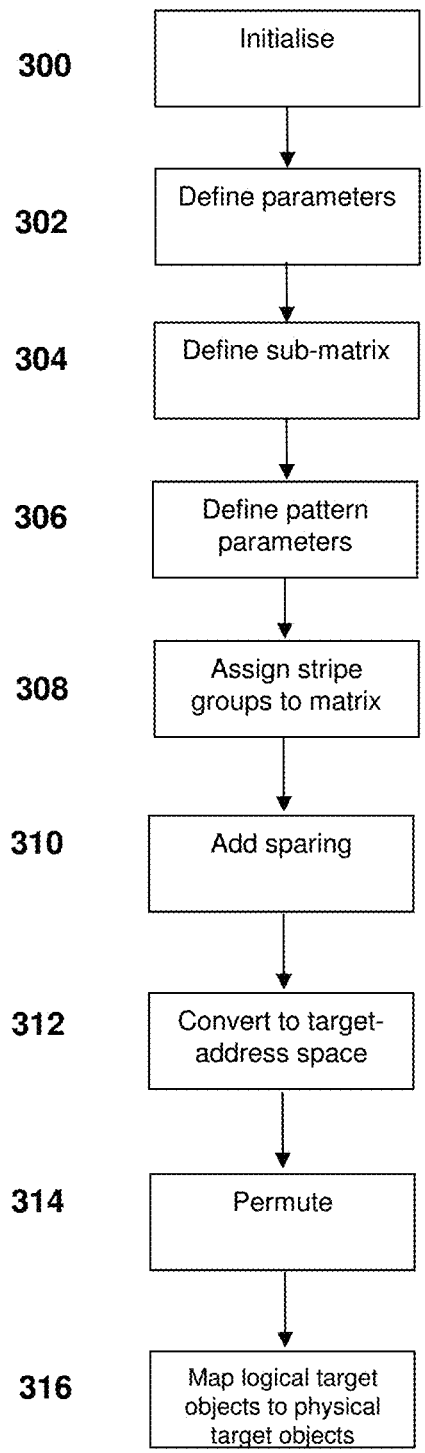

FIG. 13 illustrates an exemplary RAID array in which a single drive has failed. The failed drive is denoted by the dark line. Grey units are the units on the surviving hard drives which need to be accessed in order to rebuild the failed drive;

FIG. 14 is a graph showing test data on the effect of the configuration parameter R on the repair rate of a RAID array for a [41 (8+2+1)] configuration system;

FIG. 15 is a graph similar to FIG. 14 showing test data on the effect of the configuration parameter R on the repair rate of a RAID array for a [42 (8+2+2)] configuration system; and FIG. 16 is a flowchart illustrating a method in accordance with another embodiment of the present invention.

The present invention aims to enable spare space to be incorporated into a parity distributed RAID arrangement.

Figure 4:
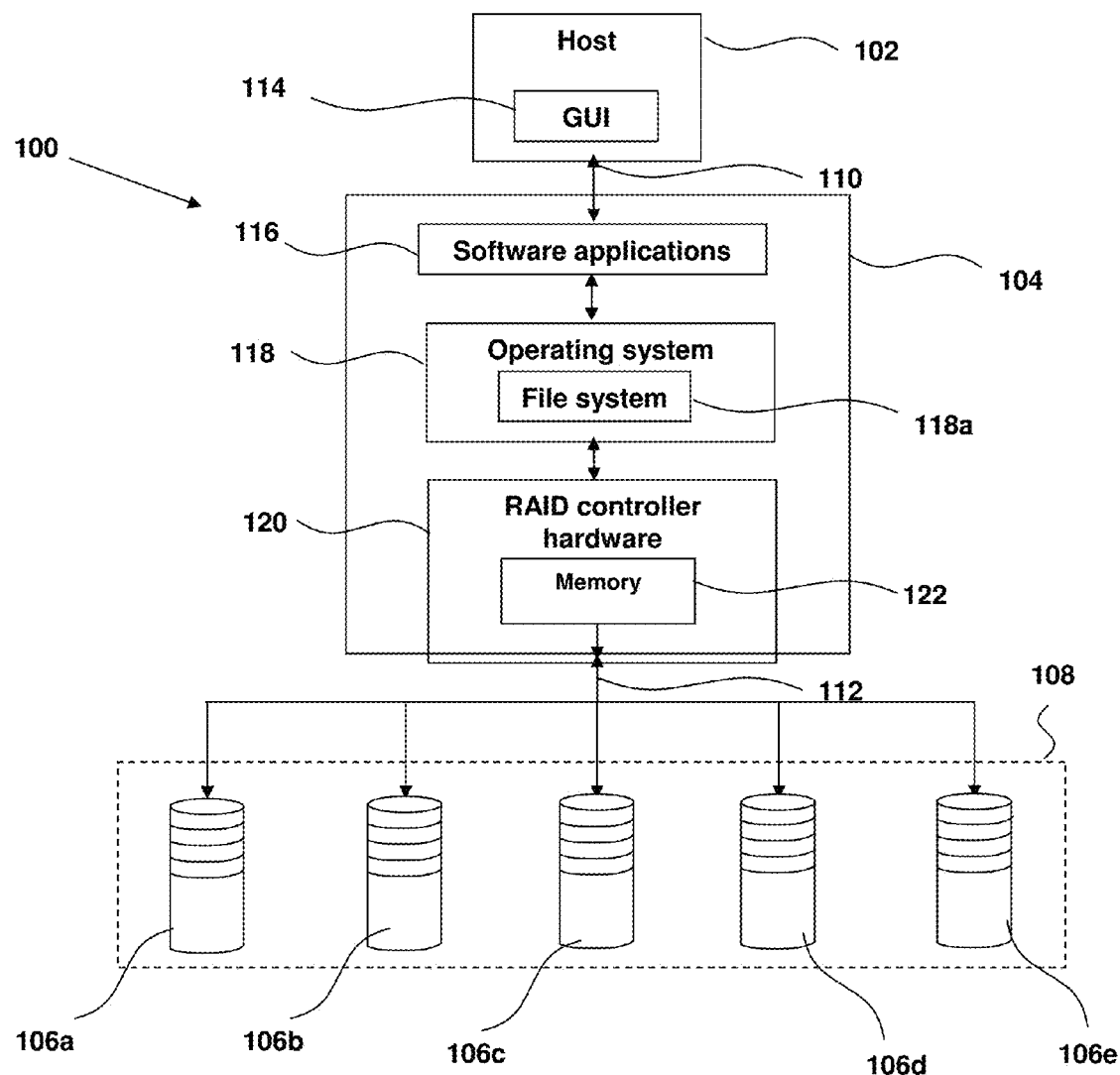
FIG. 4 is a schematic diagram showing a RAID controller suitable for use with an embodiment of the present invention.

FIG. 4 shows a schematic diagram of a storage resource 100 that may be used with the present invention. The storage resource 100 comprises a host 102, a RAID controller 104, and storage devices 106a, 106b, 106c, 106d and 106e which, together, form part of a RAID 6 array 108.

The host 102 is connected to the RAID controller 104 through a communication network 110 such as an Ethernet and the RAID controller 104 is, in turn, connected to the storage devices 106a-e via a storage network 112 such as an iSCSI network.

The host 102 comprises a general purpose computer (PC) which is operated by a user and which has access to the storage resource 100. A graphical user interface (GUI) 114 is run on the host 102. The GUI 114 is a software application which acts as a user interface for a user of the host 102.

The RAID controller 104 comprises a software application layer 116, an operating system 118 and RAID controller hardware 120. The software application layer 116 comprises software applications including the algorithms and logic necessary for the initialisation and run-time operation of the RAID controller 104. The software application layer 116 includes software functional blocks such as a system manager for fault management, task scheduling and power management. The software application layer 116 also receives commands from the host 102 (e.g., assigning new volumes, read/write commands) and executes those commands. Commands that cannot be processed (because of lack of space available, for example) are returned as error messages to the user of the host 102.

The operation of the RAID controller 104 may be set at the Application Programming Interface (API) level. Typically, Original Equipment Manufactures (OEMs) provide RAID networks to end users for network storage. OEMs generally customise a RAID network and tune the network performance through an API.

The operating system 118 utilises an industry-standard software platform such as, for example, Linux, upon which the software applications forming part of the software application layer 116 can run. The operating system 118 comprises a file system 118a which enables the RAID controller 104 to store and transfer files and interprets the data stored on the primary and secondary drives into, for example, files and directories for use by the operating system 118.

The RAID controller hardware 120 is the physical processor platform of the RAID controller 104 that executes the software applications in the software application layer 116. The RAID controller hardware 120 comprises a microprocessor, memory 122, and all other electronic devices necessary for RAID control of the storage devices 106a-e.

The storage devices 106 may take any suitable form; for example, tape drives, disk drives, non-volatile memory, or solid state devices. Although most RAID architectures use hard disk drives as the main storage devices, it will be clear to the person skilled in the art that the embodiments described herein apply to any type of suitable storage device. More than one drive may form a storage device 106; for example, a RAID array of drives may form a single storage device 106. The skilled person will be readily aware that the above features of the present embodiment could be implemented in a variety of suitable configurations and arrangements.

As set out above, the term "storage device" in the context of the following description may refer to a logical drive which is formed on the RAID array 108. In this case, a sector refers to a portion of the logical drive created on the RAID array 108. The following embodiment of the present invention is applicable to any of the above described arrangements.

In this embodiment, the storage devices 106 are formatted such that each sector comprises 512 bytes (4096 bits). The term "sector" used herein is generally applicable to any sector sizes. Therefore, the term "sector" is merely intended to indicate a portion of the storage availability on a storage device and is not intended to be limited to any of the disclosed examples. Additionally, sector may be used to refer to a portion of a logical drive, i.e. a virtual drive created from a plurality of physical hard drives linked together in a RAID configuration.

Figure 1:
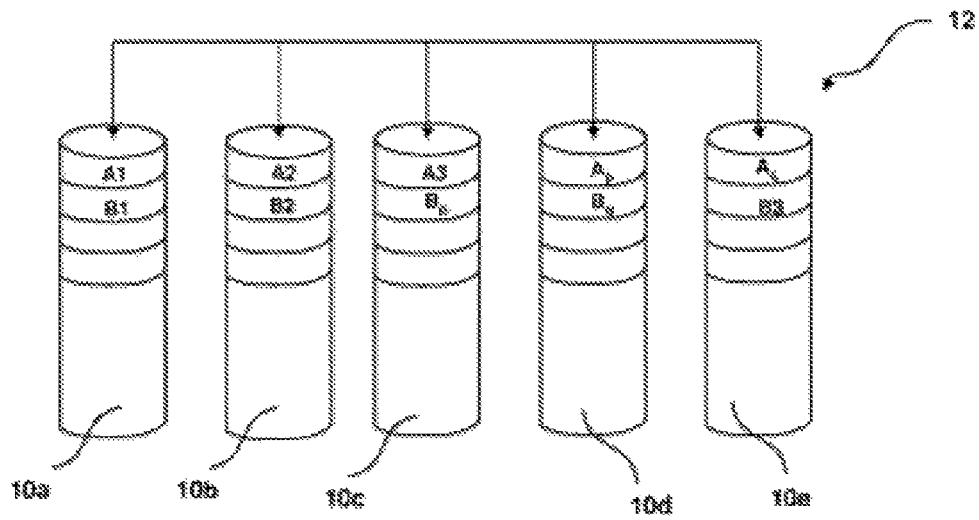
FIG. 1 is a schematic diagram of a known RAID array.
Figure 2:
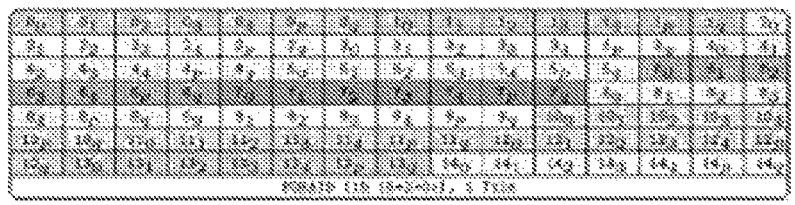
FIG. 2 is a schematic diagram showing a known matrix arrangement illustrating the data layout on a RAID array.

Further, whilst only a single server and RAID array is shown in FIG. 2, any number of RAID controllers 104 may be provided to serve any number of storage devices forming an array.

The RAID controller 104 stores configuration metadata for the RAID array 108. This denotes the configuration of data storage on the RAID array 108 as described above. The present invention is concerned with improved arrangements of data configuration as will be described below.

The following embodiment of the invention may be utilised with the above RAID arrangement. In the following description, for brevity, a single storage device 106a will be referred to. However, the embodiment of the invention is equally applicable to other arrangements; for example, the storage device 106a may be a logical drive, or may be a single hard disk drive.

The configuration of the data on the RAID array 108 is governed by the configuration data as set out in one or more matrices. The present invention seeks to provide matrix configurations in which the benefits of PDRAID are preserved, but under which recovery can occur much more quickly by taking advantage of the properties of modern hard disk drives.

In the context of the present invention, a matrix represents a part of a layout mapping function for the RAID array. The following parameters as utilised by the present invention will be described below.

A unit is the smallest block of information handled by the matrix. As described above, a unit is a fixed width block of contiguously addressed information that is measured in bytes. Units are analogous with chunks and in PDRAID all units are of equal length. Units may contain data or parity information, or may be reserved as sparing space. The set of all units in a configuration are enumerated and ordered; this set is referred to as the unit-address space.

A target object is a storage entity (in this embodiment, a hard drive) that is divided into "frames". The capacity of a frame is equal to unit length and as such a frame stores precisely one unit of information. A pool is a collection of target objects. There are P target objects in a pool.

A stripe group G is a set of data units and parity units. In a single stripe group G, there are N data units and K parity units. Units in G are ordered as follows: {data 0, data 1, . . . , data N−1, parity 0, parity 1, . . . parity K−1}. All stripe groups G in a configuration are equal in length for N, K, and consequently |G|.

Further, each unit in a stripe group is identified as a (group number, unit number) ordered pair. The set containing all stripe groups is lexicographically ordered and is called the group-address space. For example, a configuration containing groups comprised of N+K=3 units per group is ordered as follows:

Group-address space={(0,0), (0,1), (0,2), (1,0), (1,1), (1,2) . . . }.

Frames inside of a target object are ordered, as are the target objects of a pool. Therefore, an arbitrary frame can be identified as an ordered pair: (frame number, target number). The set containing all frames from all target objects is also lexicographically ordered and is named the target-address space:

Target address space={(0,0), (0,1), (0,2), (0,3), (1,0), (1,1), (1,2), (1,3), (2,0), (2,1), (2,2), (2,3), . . . }.

An example is shown in Table 1 below:

TABLE 1

| Target 0 | Target 1 | Target 2 | Target 3 |
|---|---|---|---|
| frame 0 | frame 0 | frame 0 | frame 0 |
| frame 1 | frame 1 | frame 1 | frame 1 |
| frame 2 | frame 2 | frame 2 | frame 2 |
| ... | ... | ... | ... |

To compare, when the target address space is thought of as an array of frame rows and target columns, then the set is row-major ordered.

The unit-address space is laid out sequentially over the target-address space and therefore the target-address space can be redrawn as follows:

TABLE 2

| Target 0 | Target 1 | Target 2 | Target 3 |
|---|---|---|---|
| unit 0 | unit 1 | unit 2 | unit 3 |
| unit 4 | unit 5 | unit 6 | unit 7 |
| unit 8 | unit 9 | unit 10 | unit 11 |
| ... | ... | ... | ... |

A layout is then the mapping of the group-address space to the target-address space. In other words, each (group number, unit number) element maps to a unique (frame number, target number) element. The matrix construct is then used as part of the layout function.

For the purposes of this embodiment of the present invention, a PDRAID array configuration is denoted as set out in expression 1):

[P(N+K+A)]    1)

where P is the number of target devices in the array, N is the number of data units per stripe-group, K is the number of parity units per stripe-group, and A is the number of distributed spares.

Distributed spares are spare space which is pseudo-randomly distributed within the matrix configuration as will be described below. However, A can be considered to be the number of target objects in a pool dedicated to providing spare space.

These parameters are used to define the matrix layout as part of the present invention.

In the approach of the present invention, a matrix comprises P columns which represent the total number P of target objects in the array pool.

The parameter A is then defined. As noted above, A represents the number of target objects set aside as spare space. Therefore, implicitly, A is the number of spare units per P units of space on the matrix, and A/P is the ratio of spare space to total space on the matrix.

Next, a sub-matrix (or sub-matrix) is defined. The sub-matrix comprises P' columns and L rows, defining a total of P'×L units in the sub-matrix.

In this embodiment, P' is necessarily smaller than P and P'=P−A. In other words, P' represents the number of target objects to which data or parity data will be stored in use. Alternatively, P' represents the number of target objects in the array pool minus the number of target objects A set aside for spare space.

Further, bounds are placed on the acceptable values of L as follows. A requirement for the matrix configuration is that a stripe group does not cross a matrix boundary, i.e. the matrix is arranged such that entire stripe groups fit onto a given matrix. No partial stripe groups are allowed.

To achieve this, the parameter B is defined. B is the least common multiple of N+K and P'. As noted above, N+K is the number of stripe units per stripe group and P' is the number of columns in the matrix, equal to the number of non-spare target objects in the array pool.

Thus, B is the total number of units per sub-matrix. B is used in the construction of a sub-matrix to ensure that a stripe group G does not cross a matrix boundary.

In other words, each sub-set of B units from the unit-address space comprises one sub-matrix. This implicitly means that each sub-set of B units from the target-address space is also one sub-matrix. And finally, each sub-set of B units from the group-address space is one sub-matrix.

Then, the number of stripe groups per sub-matrix, C, can be defined. C is then the number of units per sub-matrix B, divided by the total number of stripe units per stripe group G, equal to N+K. So:

$$2)\ C = \frac{B}{(N+K)}$$

Then, knowing the above, the number of rows L per sub-matrix can be defined. L is then defined as:

$$3)\ L = \frac{B}{P'}$$

Therefore, when a sub-matrix is viewed as a group object matrix, there are C rows per sub-matrix matrix and N+K columns per sub-matrix matrix.

The group-address space is laid out sequentially over the unit-address space. As discussed above, the unit-address space is also mapped sequentially over the target-address space. To bring these together and to illustrate a sub-matrix, consider a configuration where P'=4, N=1, and K=2. Then, B=12 (i.e. the least common multiple of 3 and 4) and the first sub-matrix is as set out in Table 3 below:

TABLE 3

| Target 0 | Target 1 | Target 2 | Target 3 |
|---|---|---|---|
| G0.D0 | G0.P0 | G0.P1 | G1.D0 |
| G1.P0 | G1.P1 | G2.D0 | G2.P0 |
| G2.P1 | G3.D0 | G3.P0 | G3.P1 |

The above sub-matrix comprises P' columns and L rows. To form the complete matrix or matrix of P columns and L rows (which equals P×L units in total) in target object matrix form, it is necessary to augment the sub-matrix by adding A columns.

The full matrix still has only L rows, however the matrix has grown to include all P columns (equal to the total P target objects). These additional units that have been added to the sub-matrix are the spare units for the sub-matrix. There are, thus, exactly A spare units per row.

The $n^{th}$ spare unit for any frame in the $j^{th}$ row for an P×L matrix is (j, P'+n). When a target object failure occurs, units from the failed target object are mapped to the spare units for each corresponding frame.

To illustrate further, consider a configuration as set out in Table 4. In Table 4, P=6 and A=2:

TABLE 4

| Target 0 | Target 1 | Target 2 | Target 3 | Target 4 | Target 5 |
|---|---|---|---|---|---|
| G0.D0 | G0.P0 | G0.P1 | G1.D0 | SA.0 | SB.0 |
| G1.P0 | G1.P1 | G2.D0 | G2.P0 | SA.1 | SB.1 |
| G2.P1 | G3.D0 | G3.P0 | G3.P1 | SA.2 | SB.1 |

Therefore, as shown, target objects 0 to 3 comprise data or parity data, and target objects 4 and 5 comprise spare space—target object 4 comprising spare A and target object 5 comprising spare B.

It is then necessary to map the target objects used for data/parity storage to free space in the event of a failure. By way of example, if any of target objects 0 to 3 fail, then that target object will be mapped to spare A—target object 4.

If a further remaining target object from the group of target objects 0 to 3 was to fail at a later time, then this target object would be mapped to spare B—i.e. target object 5.

In other words, target object 4 has been assigned a higher priority and will be used first in the event of a failure.

As described so far, the target objects have been logical target objects. However, a further mapping can be employed in order to permute the columns of the full-matrix. This can be done safely without any reorganization of the data on each target object.

The final result is then a mapping of the logical target objects (columns) to physical target objects. The permutation is a function of the matrix number and, again, greater detail is given in the aforementioned reference. However, it is noted here that the permutation includes all P logical target objects.

Figure 5:
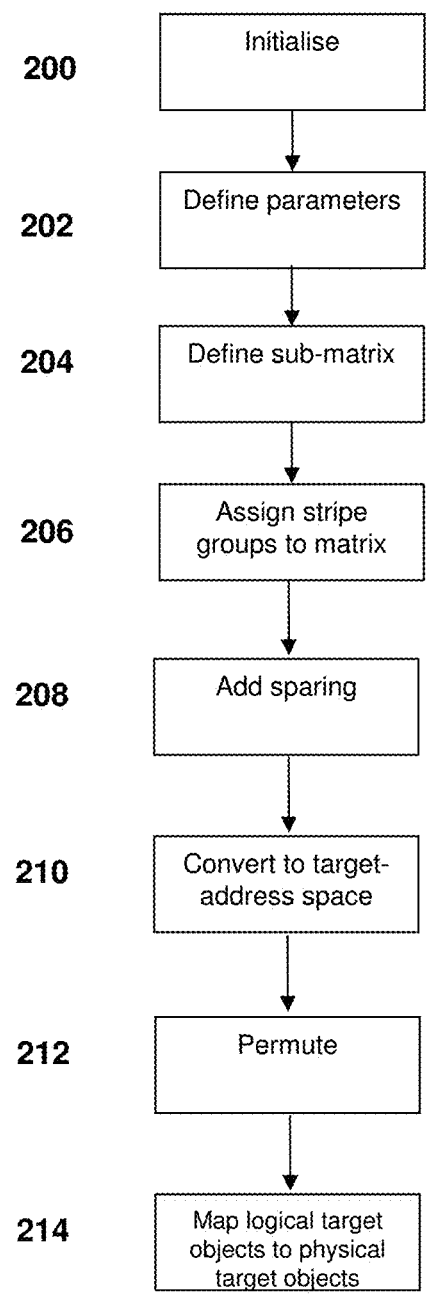
FIG. 5 is a flowchart illustrating a method in accordance with an embodiment of the present invention.

A method according to an embodiment of the present invention will now be described with reference to FIG. 5. FIG. 5 shows a flow chart for carrying out the method according to an embodiment.

Step 200: Initialise System

At step 200, the mapping system is initialised. The mapping system may comprise a software application run on the storage system 100 e.g. as a software application 116 run on the operating system 118. Alternatively, and non-exhaustively, the mapping system may be run from a remote server or from hardware or firmware.

The mapping system is operable to configure the structure of a RAID array 108 and to specify key parameters of the configuration metadata. The method then proceeds to step 202.

Step 202: Define Matrix Parameters

In step 202, the parameters of a matrix (i.e. target object matrix) are defined. The number of drives, unit size and stripe group parameters (e.g. P, N and K) are defined. The number of drives P includes all the available units on a RAID array.

Then, the value of the number of spares A per P target objects is defined. The ratio A/P is, therefore, the ratio of spare space to used space. Based on this, the parameter P' can be defined, where P'=P−A.

Note that the requirement that no one drive may contain more than one stripe unit of a given stripe group places bounds on the acceptable values of P', N and K. Clearly, if N+K>P' this criterion would not be met.

The number of rows L is also allocated in this step. As noted above, a requirement for the matrix configuration is that a stripe group does not cross a matrix boundary, i.e. the matrix is arranged such that entire stripe groups fit onto a given matrix. No partial stripe groups are allowed.

To achieve this, L is determined in accordance with equation 3) above using the parameter B, i.e. the least common multiple of N+K and P'.

As noted above, N+K is the number of stripe units per stripe group and P' is the number of columns in the matrix, equal to the number of non-spare target objects in the array pool. The number of stripe groups per matrix is then C, as determined from equation 2) above. The method proceeds to step 204.

Step 204: Define Sub-Matrix

In step 204, the sub-matrix is defined. The sub-matrix (or sub-matrix) has P' columns, where P'=P−A. In other words, the sub-matrix comprises the target objects P to be used to store data and parity data, minus the number of target objects A to be used as spare space.

The sub-matrix also has L rows as defined in step 202.

Figure 3:
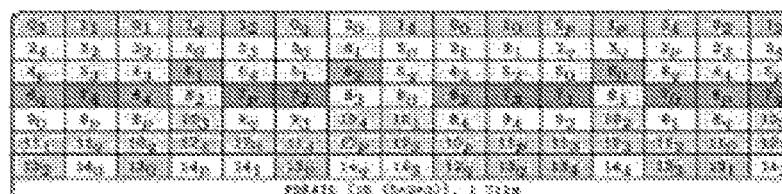
FIG. 3 is a schematic diagram showing the matrix arrangement of FIG. 2 in which the data columns have been permuted according to a pseudo-random code.

Consider the example of FIGS. 2 and 3 in the context of the present invention. Consider a [15(5+2+2)] matrix. In other words, in this example, P=15, N=5, K=2 and A=2. Therefore, P'=13.

Consequently B (calculated in as described above) is 91 and so C=7 (in accordance with equation 2)) and L=7 (in accordance with equation 3)).

Figures 6, 7, 8:
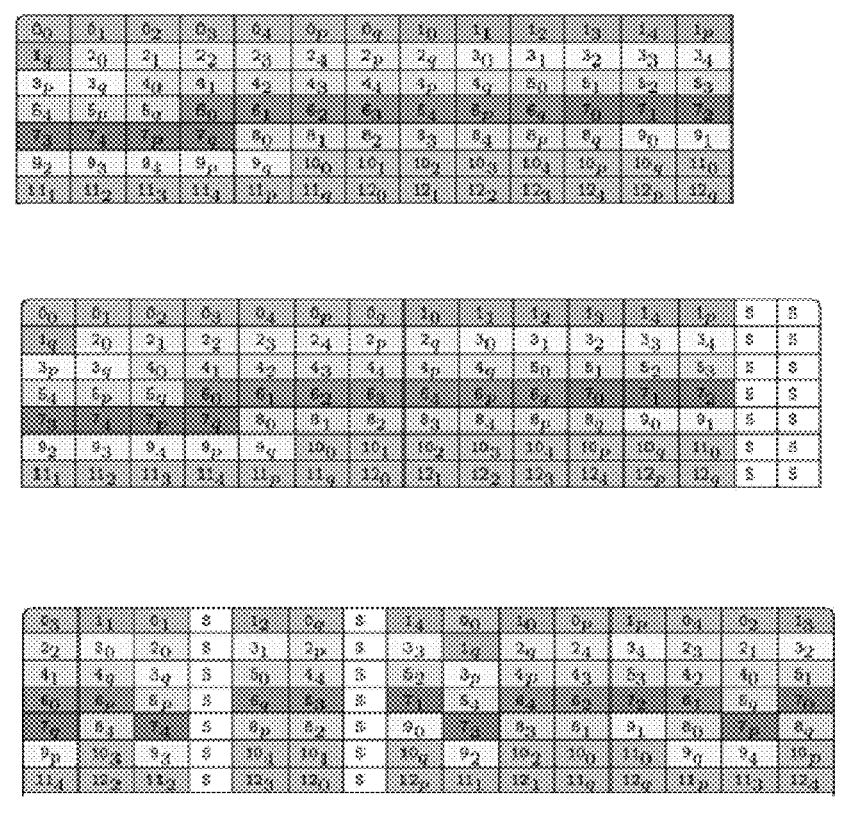

A sub-matrix so formed is shown in FIG. 6. Note that this sub-matrix has already been assigned stripe groups as set out in the next step. The method proceeds to step 206.

Step 206: Assign Stripe Groups to Sub-Matrix

In step 206, the stripe groups are assigned to the or each matrix as required. This defines the number and configuration of the stripe groups per individual pattern which will then be propagated through the matrix.

In one embodiment, the stripe groups are arranged sequentially along each row such that a different stripe unit of a given stripe is located on a different target object. Once the end of a row is reached, the mapping tracks back to the start of the next row and continues.

This is shown in FIG. 6 for the [15 (5+2+2)] PDRAID example. The method proceeds to step 208.

Step 208: Add Sparing to Sub-Matrix

In step 208, the A spare target objects are added to the sub-matrix to form the complete matrix. Using the example sub-matrix of FIG. 6, this now becomes the complete matrix of FIG. 7. The method proceeds to step 210.

Step 210: Convert to Logical Target-Address Space

In step 210, the stripe groups in each matrix are assigned a logical target (i.e. the hard drive upon which a given unit within a stripe group is stored) and a column frame offset (i.e. the location of the unit within the data arrangement on the given hard drive) for use by the RAID hardware. The method proceeds to step 212.

Step 212: Permute

As discussed above, the columns of the matrix can safely be permuted between target objects. In other words, the columns of data defined in previous steps can pseudo-randomly be assigned to different hard drives to improve the distribution of data on the RAID array. This equally applies to the target objects designated as spares. This is shown in FIG. 8.

The method proceeds to step 214.

Step 214: Map Logical Target Objects to Physical Target Objects.

The permutation in step 212 involves a permutation of the logical target objects. A mapping is then required to ensure that the logical target objects map to the correct physical target objects (i.e. the hard drives).

The method then ends and the PDRAID array is ready for use.

A further worked example of the above approach is shown with regard to the following tables 5 to 9. Consider the following configuration of matrix. Firstly, each stripe group G comprises a single data unit and two parity units. Therefore, N=1 and K=2.

The total number of target objects in the array is 6, and the number of spare units is 2. Therefore, P=6, A=2 and P'=4.

Consequently, B, C and L can be determined. B is the lowest common multiple of N+K (=3) and P' (=4). Therefore B=4. From equation 2), C then equals 4, and from equation 3), L=3. Table 5 shows the sub-matrix so configured, with P' columns (=4) and L rows (=3).

TABLE 5

| Target 0 | Target 1 | Target 2 | Target 3 |
| --- | --- | --- | --- |
| G0.D0 | G0.P0 | G0.P1 | G1.D0 |
| G1.P0 | G1.P1 | G2.D0 | G2.P0 |
| G2.P1 | G3.D0 | G3.P0 | G3.P1 |

Then, to the sub-matrix, the A target objects designated as spare space are then added. This results in the configuration shown in Table 6 below:

TABLE 6

| Target 0 | Target 1 | Target 2 | Target 3 | Target 4 | Target 5 |
| --- | --- | --- | --- | --- | --- |
| G0.D0 | G0.P0 | G0.P1 | G1.D0 | SA.0 | SB.0 |
| G1.P0 | G1.P1 | G2.D0 | G2.P0 | SA.1 | SB.1 |
| G2.P1 | G3.D0 | G3.P0 | G3.P1 | SA.2 | SB.1 |

The complete matrix (or complete matrix) can then be permuted with respect to the target objects. This then requires a mapping between the physical target objects and the logical target objects as shown in Table 7 below:

TABLE 7

| Physical Targets | | | | | |
| --- | --- | --- | --- | --- | --- |
| 0 | 1 | 2 | 3 | 4 | 5 |
| Logical Targets | | | | | |
| 5 | 1 | 4 | 3 | 2 | 0 |
| SB.0 | G0.P0 | SA.0 | G1.D0 | G0.P1 | G0.D0 |
| SB.1 | G1.P1 | SA.1 | G2.P0 | G2.D0 | G1.P0 |
| SB.2 | G3.D0 | SA.2 | G3.P1 | G3.P0 | G2.P1 |

Then, should one of the physical target objects 0 to 3 fail, then a mapping to a spare can be achieved. Consider, for example, that logical target object 3 has failed. This can then be mapped to logical target 4, which is spare target object A. This is shown in Table 8:

TABLE 8

| Physical Targets | | | | | |
| --- | --- | --- | --- | --- | --- |
| 0 | 1 | 2 | 3 | 4 | 5 |
| Logical Targets | | | | | |
| 5 | 1 | 4 | 3 | 2 | 0 |
| SB.0 | G0.P0 | SA.0 = G1.D0 | — | G0.P1 | G0.D0 |
| SB.1 | G1.P1 | SA.1 = G2.P0 | — | G2.D0 | G1.P0 |
| SB.2 | G3.D0 | SA.2 = G3.P1 | — | G3.P0 | G2.P1 |

Then, should a second failure occur, the failed target object can then be mapped to logical target 5, which is spare B. In the example shown in Table 9, logical target 0 has failed and this is mapped to spare B (logical target 5):

TABLE 9

| Physical Targets | | | | | |
| --- | --- | --- | --- | --- | --- |
| 0 | 1 | 2 | 3 | 4 | 5 |
| Logical Targets | | | | | |
| 5 | 1 | 4 | 3 | 2 | 0 |
| SB.0 = G0.D0 | G0.P0 | SA.0 = G1.D0 | — | G0.P1 | — |
| SB.1 = G1.P0 | G1.P2 | SA.1 = G2.P0 | — | G2.D0 | — |
| SB.2 = G2.P1 | G3.D0 | SA.2 = G3.P1 | — | G3.P0 | — |

Practically, this mapping means that, in the event a failure of a drive, the data in the failed column is regenerated into the first spare column (spare A in the above example). In the event of a second failure, the data in the second failed column is regenerated into the second spare column (spare B in the above example) and so on.

Once the failed drive has been physically replaced, then the data in the spare column (either A or B in the above example) is copied back to the column of the replacement disk so that the spare is freed. In this way, the spare space can be reused without the need to reallocate a new spare drive.

A second embodiment of the present invention will now be described. In addition to the examples outlined above, further parameters R and W are introduced which enable efficient optimisation of a RAID configuration.

One aspect of this embodiment is to map stripe-groups across the hard drives in a sub-matrix in sequential patterns to enable efficient access to the data in the event of a drive failure requiring a rebuilding operation. In other words, a set of stripe groups is mapped into the sub-matrix space in a given pattern and then the pattern is repeated sequentially on disk, so that stripe-groups are effectively stacked.

Parameter W is known as the width and represents how many stripe-groups are laid down along the columns across the matrix before the pattern is repeated.

Parameter R is the repeat count, and specifies along how many rows the pattern is to be repeated.

Therefore, parameters W and R can be likened to X and Y axes of a matrix respectively, with the value of W for a given pattern denoting how many sequential stripe groups extend in the "X axis" of the pattern and the value of R determining how many stripe groups extend in the "Y-axis" of the pattern. Thus, the total number of stripe groups in a given pattern is equal to W×R.

In other words, consider a pattern comprising a sequence of stripe groups from 0 to N, where W×R=N. Thus, the parameter W sets out that the pattern will comprise stripe groups 0 to W in the first row of the pattern, with R rows.

In embodiments, W is specified as the largest whole number of stripe-groups that will fit into the device count. For instance, if the stripe-group size is 10 units and the number of drives is 39, W is equal to int(39/10)=3.

The width W can be larger than this, but this may cause skipping in the access pattern. The width W can also be less, though this will reduce the amount of parallelism we can achieve when presented with low-queue-depth IO.

Figures 9, 10:
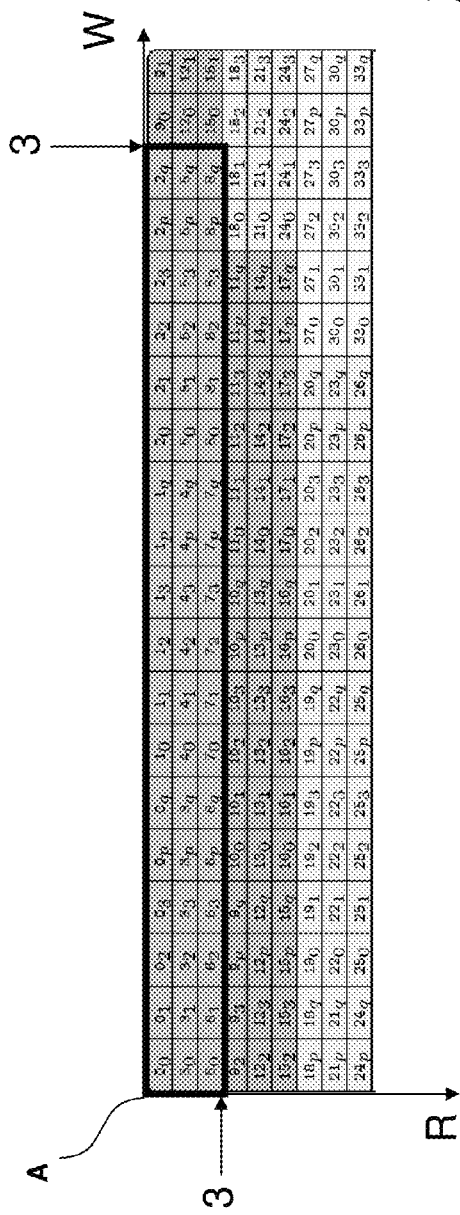
FIG. 9 is a schematic diagram showing a further alternative sub-matrix arrangement illustrating the data layout on a RAID array in accordance with an embodiment of the present invention.
FIG. 10 is a schematic diagram showing a further alternative sub-matrix arrangement illustrating the data layout on a RAID array in accordance with an embodiment of the present invention.

FIG. 9 illustrates a basic example of this. Note that FIG. 9 shows a sub-matrix and sparing has been ignored for clarity. FIG. 9 shows a 20 drive sub-matrix in which the stripe groups comprise 4 data units and 2 parity units in a [20 (4+2)] configuration. In FIG. 9, the matrix is arranged with a sequential pattern of stripe groups where, for each pattern, W=3 and R=3. Take, for example, pattern A illustrated. As shown, pattern A comprises W×R=9 stripe groups, each of six (4+2) units each.

Therefore, stripe groups 0 to 2 extend along the first row, then stripe groups 3 to 5 along the second row and so on. The pattern is then repeated for later stripe groups.

Figures 11, 12:
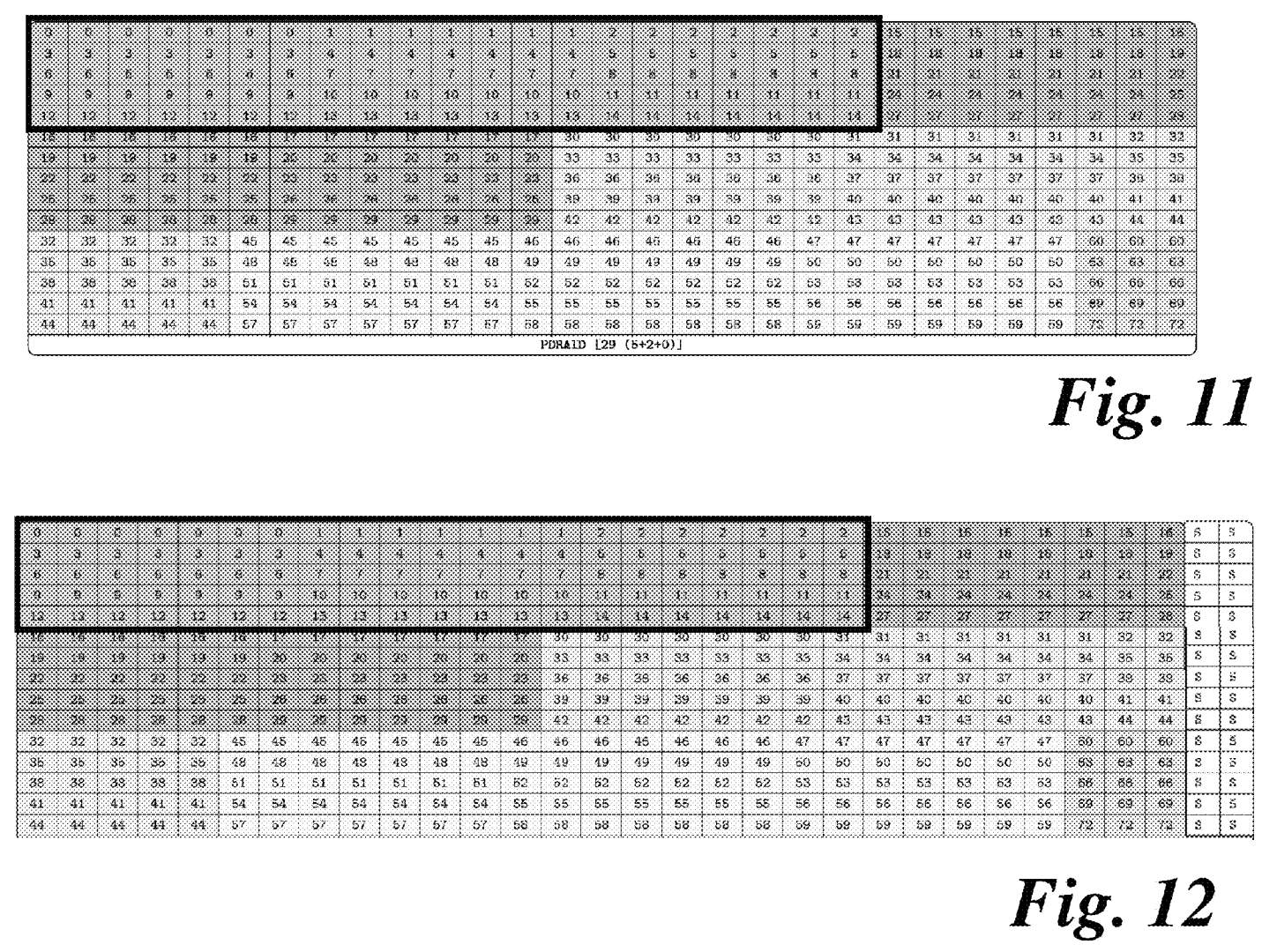

Different arrangements of W and R can be utilised to optimise the pattern layout for different configurations or end uses. FIGS. 10 and 11 illustrate the effect of W and R on the data patterns.

FIG. 10 shows a 29 drive sub-matrix in which the stripe groups comprise 5 data units and 2 parity units in a [29 (5+2)] configuration. The matrix of FIG. 10 is arranged with a sequential pattern of stripe groups where, for each pattern, W=1 and R=5. Therefore, each pattern comprises 1×5=5 stripe groups. Considering the first pattern (shown in a black box), only the first stripe group (stripe group 0) extends across the drives, with stripe groups 1 to 4 arranged below. In other words, individual units in stripe groups 0 to 4 are arranged sequentially along a row (i.e. on a given drive). This pattern is then repeated for all stripe groups.

In contrast, FIG. 11 shows a similar 29 drive sub-matrix in which the stripe groups comprise 5 data units and 2 parity units in a [29 (5+2)] configuration. However, the matrix of FIG. 8 is arranged with a sequential pattern of stripe groups where, for each pattern, W=3 and R=5. Therefore, each pattern comprises 3×5=15 stripe groups.

Considering the first pattern (shown in a black box), the first to third stripe groups (stripe groups 0 to 2) extends across the drives, with stripe groups 3 to 5 arranged below and so on. In other words, individual units in stripe groups 0, 3, 6, 9 and 12 are arranged sequentially along a row (i.e. on a given drive) in the pattern.

In the examples of FIGS. 10 and 11, stripe groups are aligned onto the same hard disks as required within the sub-matrix. As shown, the purpose of W is to increase parallelism across the drives. This has benefits for drive arrays which receive only a small amount of I/O requests. Consider, for example, that there is only sufficient client I/O data to fill three stripe groups. In the case of FIG. 10, where W=1, then only 7 of the hard disks would be accessed.

However, where W=3 as shown in FIG. 11, 21 of the hard disks can be utilised without losing any of the benefits of the improved recovery performance.

Note that the above examples shown in FIGS. 9 to 11 comprise sub-matrices. In other words, the P' value is given. If sparing is now added, then this would resemble FIG. 12. FIG. 12 shows a full matrix based on the sub-matrix shown in FIG. 11. In this example, P=31, A=2 and P'=29.

W becomes a more critical parameter as the value of R increases. Consider a situation where W=1 and R is increased. As R increases, more and more client I/O data is required to fill the pattern of repeated stripes and begin to access a different set of hard disks. In an extreme case, a bottleneck may be created on a few disks due to the lack of parallelism.

FIG. 13 shows the benefit of this approach in practice. FIG. 13 shows a 35 hard drive, 8+2 PDRAID arrangement in accordance an embodiment of the present invention. In this example, W=3 and R=5.

In this example, hard drive 4 has failed (as shown by the dark column). To reconstruct the data on the failed drive 4, it is necessary to access all of the units highlighted in grey.

However, in contrast to the situation with known arrangements, there are no longer single units of data or small clusters. Instead, the units that need to be read as part of the reconstruction are arranged in sequential order in groups of five or more units in the columns which each represent a drive which needs to be accessed to rebuild the missing data.

Thus, in this configuration, the hard disk read ahead mechanism can be utilised and cached read ahead data will be utilised. Thus, the arrangement enables much faster rebuilding of the drive.

The benefit of read ahead caching is, in general, proportional to R. In other words, as R increases, the recovery speed increases. However, there is a natural limit in that this criterion applies only as long as all of the hard drives are accessed uniformly. For instance, consider the example in the limit $R \to \infty$. In this situation, the entire configuration is essentially one row repeated indefinitely. Therefore, only a small subset of the total number of hard disks will be accessed during recovery. To consider this, imagine the first row of FIG. 10 being repeated an infinite number of times. Only 9 of the total number of hard disks will ever be read—those that are shaded grey as being required in the recovery.

Whilst the arrangements described above in relation to the present invention enable hard disk read ahead to be leveraged, further advantages are conferred by sequentially repeating patterns, where each pattern comprises a plurality of stripe groups, as set out in the above embodiments. For example, such patterns are generally beneficial due to reduce gaps and seeking latencies in the workload.

A further advantage of this approach is that when matrix permutations are cached, the cost of calculating a permutation is amortized over a larger space given a sequential access pattern such as repair.

Consider for instance a [41 (8+2+2)] configuration with 128 KiB chunks and R=1. Within the MD RAID architecture, a single matrix equates to 1248 striplets, the smallest unit of access in a repair workload. Therefore given a repair workload, a permutation is calculated once per every 1238 striplets that are accessed. When R=8, then the same ratio is 1:9984. Equivalently there are ⅛ the number of permutation calculations.

FIG. 14 shows an example of how recovery repair performance improves as the repeating parameter R increases. This test was conducted with a 41 hard drive PDRAID array, with stripe groups comprising 10 units—8 data and 2 parity. A single distributed spare is provided, defining this test example as a [41 (8+2+1) R×1] PDRAID array.

FIG. 14 shows the repair rate in MiB/s as a function of time in minutes. Only the first 15 minutes of repair are shown. The data shown is for values of R=1, 2, 4, 8, 16 and 32 in increasing order. W is set to 1 in this example.

Since the stripe-group size of 10 (8+2) divides evenly into 40 (41 hard drives minus 1 distributed spare), the rows-per-matrix count is exactly one. In other words, a single matrix is one chunk deep (128 KiB).

As a result of this, the repair workload appears random when R=1 and permutations are very frequently generated. However, as R is increased, the repair workload appears more sequential and fewer permutations are calculated per second.

Thus, the average repair rate performance for R=1 is 146 MiB/s whereas with R=32 the average performance is 417 MiB/s. This represents a significant gain, a 285.85% increase in repair performance.

FIG. 15 shows a similar graph illustrating how recovery repair performance improves as R increases. This test was conducted with a 41 hard drive PDRAID array, with stripe groups comprising 10 units—8 data and 2 parity. Two distributed spares are provided, defining this test example as a standard [41 (8+2+2) R×1] configuration. This is the configuration implemented in a "ClusterStor"™ arrangement.

In this example, R=1, 2, 4 and 8. W is again set to 1. Values of R greater than 8 are not used because R=8 because reaches the back-end SAS hardware limit of the test configuration.

Again, only the first 15 minutes of repair performance for each test are shown. Since the parity-group size of 10 (8+2) is coprime with 39 (41 hard drives minus 2 distributed spares), the rows-per-matrix count is also 10. Or in other words, a single matrix is ten chunks deep (1.25 MiB).

Therefore, the repair workload will appear mostly random when R=1 and possess only a small amount of coherency. As R increases, the repair workload appears more sequential and fewer permutations are calculated per second.

In FIG. 15, the average repair rate performance for R=1 is 299 MiB/s whereas with R=8, the average performance is 420 MiB/s. This also represents a significant gain, a 140.38% increase in repair performance.

A method according to a second embodiment of the present invention will now be described with reference to FIG. 16. The second embodiment incorporates the parameters R and W into the configuration of the first embodiment.

Step 300: Initialise System

At step 300, the mapping system is initialised. The mapping system may comprise a software application run on the storage system 100 e.g. as a software application 116 run on the operating system 118. Alternatively, and non-exhaustively, the mapping system may be run from a remote server or from hardware or firmware.

The mapping system is operable to configure the structure of a RAID array 108 and to specify key parameters of the configuration metadata. The method then proceeds to step 302.

Step 302: Define Matrix Parameters

In step 302, the parameters a matrix (or target object matrix) are defined. The number of drives, unit size and stripe group parameters (e.g. P, N and K) are defined. The number of drives P includes all the available units on a RAID array.

Then, the value of the number of spares A per P target objects is defined. The ratio A/P is, therefore, the ratio of spare space to used space. Based on this, the parameter P' can be defined, where P'=P−A.

Note that the requirement that no one drive may contain more than one stripe unit of a given stripe group places bounds on the acceptable values of P', N and K. Clearly, if N+K>P' this criterion would not be met.

The number of rows L is also allocated in this step. As noted above, a requirement for the matrix configuration is that a stripe group does not cross a matrix boundary, i.e. the matrix is arranged such that entire stripe groups fit onto a given matrix. No partial stripe groups are allowed.

To achieve this, L is determined in accordance with equation 3) above using the parameter B, i.e. the least common multiple of N+K and P'. As noted above, N+K is the number of stripe units per stripe group and P' is the number of columns in the matrix, equal to the number of non-spare target objects in the array pool.

The number of stripe groups per matrix is then C, as determined from equation 2) above. The method proceeds to step 304.

Step 304: Define Sub-Matrix

In step 304, the sub-matrix is defined. The sub-matrix (or sub-matrix) has P' columns, where P'=P−A. In other words, the sub-matrix comprises the target objects P to be used to store data and parity data, minus the number of target objects A to be used as spare space. The sub-matrix also has L rows as defined in step 302.

The method proceeds to step 306.

Step 306: Define Pattern Parameters

At step 306, the pattern parameters R and W are defined. In accordance with the present invention, the stripe groups in an array are arranged in patterns, where each pattern comprises a plurality of stripe groups.

R and W are specified in this step and define the width and repetition of the pattern containing a plurality of stripe groups.

When coded, the plurality of patterns comprising a plurality of stripe groups is defined as a matrix of w columns and infinite rows. Since there are R repeated patterns, each set of R rows is a "repeat set". The method proceeds to step 308.

Step 308: Assign Stripe Groups to Sub-Matrix

In step 308, the stripe groups are assigned to the or each sub-matrix as required. This defines the number and configuration of the stripe groups per individual pattern which will then be propagated through the sub-matrix.

In one embodiment, the stripe groups are arranged sequentially along each row such that a different stripe unit of a given stripe is located on a different target object. Once the end of a row is reached, the mapping tracks back to the start of the next row and continues. The method proceeds to step 310.

Step 310: Add Sparing to Sub-Matrix

In step 310, the A spare target objects are added to the sub-matrix to form the complete matrix. The method proceeds to step 312.

Step 312: Convert to Target-Address Space

In step 312, the stripe groups in each matrix are assigned a logical target (i.e. the hard drive upon which a given unit within a stripe group is stored) and a column frame offset (i.e. the location of the unit within the data arrangement on the given hard drive) for use by the RAID hardware. The method proceeds to step 314.

Step 314: Permute

As discussed above, the columns of the matrix can safely be permuted between target objects. In other words, the columns of data defined in previous steps can pseudo-randomly be assigned to different hard drives to improve the distribution of data on the RAID array. This equally applies to the target objects designated as spares. The method proceeds to step 316.

Step 316: Map Logical Target Objects to Physical Target Objects.

The permutation in step 314 involves a permutation of the logical target objects. A mapping is then required to ensure that the logical target objects map to the correct physical target objects (i.e. the hard drives).

The method then ends and the PDRAID array is ready for use.

Variations of the above embodiments will be apparent to the skilled person. The precise configuration of hardware and software components may differ and still fall within the scope of the present invention.

For example, the present invention has been described with reference to controllers in hardware. However, the controllers and/or the invention may be implemented in software. This can be done with a dedicated core in a multi-core system. Given a proper software algorithm, it should be feasible to calculate protection information in parallel with array parity so that each piece of user data is read only once.

Additionally, whilst the present embodiment relates to arrangements operating predominantly in off-host firmware or software (e.g. on the RAID controller), an on-host arrangement could be used.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method of defining a layout mapping function for a parity distributed RAID array comprising a plurality of target objects, the layout mapping function defining the mapping of a stripe group-address space to a target-address space in the array and comprising a matrix defining a unit space across the plurality of target objects, the matrix comprising columns defining the plurality of target objects and rows defining equally-offset sequential units on the plurality target objects, the method comprising:
specifying, on a computing apparatus, P target objects, where P>1;
specifying, on a computing apparatus, A target objects as spare space, where A<P and A>1;
defining, on a computing apparatus, a sub-matrix of P' columns, where P'=P−A;
defining, on a computing apparatus, a layout of stripe groups across the P' target objects in the sub-matrix, each stripe group comprising a plurality of data units and a plurality of parity units;
adding, on a computing apparatus, A columns, representative of the A spare space target objects, to the sub-matrix to form a complete matrix defining the layout mapping function; and
implementing, on a computing apparatus, the layout mapping function on the target objects of the RAID array.

2. The method according to claim 1, wherein, prior to implementing the layout mapping function, the method further comprises permuting columns of the complete matrix to assign different columns to different target objects.

3. The method according to claim 2, wherein, the permuting involves pseudo-random permutation.

4. The method according to claim 2, further comprising providing a mapping between permuted logical target addresses resulting from the permuting and physical target addresses representative of the plurality of target objects.

5. The method according to claim 1, wherein the plurality of target objects are allocated as spare space such that A>1, and the plurality of target objects allocated as spare space are prioritized such that a selected one of the plurality of target objects having a highest priority is used first in response to a failure.

6. The method according to claim 1, wherein, in response to a failure of a target object, the method further comprises copying data in the column corresponding to the failed target object to one of the A columns corresponding to spare space.

7. The method according to claim 6, wherein, subsequent to a failure of a target object, the failed target object is replaced with a replacement target object, the method further comprising:
associating the replacement target object with one of the P' columns; and
copying data from the one of A columns corresponding to spare space to the one of P' columns associated with the replacement target object.

8. The method according to claim 1, wherein defining the layout of stripe groups further comprises defining a pattern comprising a plurality of stripe groups and repeating the pattern across the sub-matrix.

9. The method according to claim 8, wherein the pattern is defined by a width parameter, the width parameter specifying a number of stripe groups to be distributed across the columns of the matrix before the pattern is repeated and wherein the widthparameter is greater than 1.

10. The method according to claim 9, wherein the width parameter is selected as an integer of the number of target objects divided by the number of units in a stripe group.

11. The method according to claim 8, wherein the pattern is defined by a repeat parameter, the repeat parameter specifying a number of stripe groups to be distributed sequentially down the rows of the matrix before the pattern is repeated and wherein the repeat parameter is greater than 1.

12. The method according to claim 1, wherein the plurality of target objects comprise hard drives forming part of the RAID array.

13. The method according to claim 1, wherein the layout mapping function comprises a plurality of matrices.

14. A computing apparatus comprising:
a physical processor, the computing apparatus being operable to define a layout mapping function for a parity distributed RAID array comprising
a plurality of target objects,
the layout mapping function defining the mapping of a group-address space to a target-address space in the array and comprising a matrix defining a unit space across the plurality of target objects, the matrix comprising columns defining the plurality of target objects and rows defining equally-offset sequential units on the plurality of target objects, the computing apparatus further comprising:
operations to specify more than one target object;
operations to specify at least one but less than a total number of target objects as spare space;
operations to define a sub-matrix of columns comprising a difference between the total number of target object and the spare space target objects;
operations to define a layout of stripe groups across the sub-matrix, each stripe group comprising a plurality of data units and a plurality of parity units;
operations to add additional columns, representative of the spare space target objects, to the sub-matrix to form a complete matrix defining the layout mapping function; and operations to implement the layout mapping function on the target objects of the RAID array.

15. The computing apparatus according to claim 14, further comprising operations to permute the columns of the complete matrix to assign different columns to different target objects.

16. The computing apparatus according to claim 15, wherein the permuting of the columns involves pseudo-random permutation.

17. The computing apparatus according to claim 15, wherein the permuting of the columns further comprises providing a mapping between permuted logical target addresses resulting from the permuting of the columns and physical target addresses representative of the plurality of target objects.

18. The computing apparatus according to claim 14, wherein the plurality of target objects allocated as spare space are greater than one, and the plurality of target objects allocated as spare space are prioritised such that a selected one of the plurality of target objects having a highest priority is used first in response to a failure.

19. The computing apparatus according to claim 14, wherein the computing apparatus is operable to define a pattern comprising a plurality of stripe groups and repeating the pattern across the sub-matrix.

20. The computing apparatus according to claim 19, wherein the pattern is defined by a width parameter, the width parameter specifying a number of stripe groups to be distributed across the columns of the matrix before the pattern is repeated and wherein the width parameter is greater than 1.

21. The computing apparatus according to claim 19, wherein the pattern is defined by a repeat parameter, the repeat parameter specifying a number of stripe groups to be distributed sequentially down the rows of the matrix before the pattern is repeated and wherein the repeat parameter is greater than 1.

22. The computing apparatus according to claim 14, wherein, in response to a failure of a target object, the computing apparatus further comprises operations to copy data in the column corresponding to the failed target object to one of the columns corresponding to spare space.

23. The computing apparatus according to claim 22, wherein, subsequent to a failure of a target object, the failed target object is replaced with a replacement target object and the computing apparatus is further operable to: associate the replacement target object with a column of the sub-matrix; and copy data from the columns corresponding to spare space to the column of the sub-matrix associated with the replacement target object.

24. The computing apparatus according to claim 14, wherein the plurality of target objects comprise storage devices forming part of the RAID array.

25. A parity distributed storage array comprising a plurality of storage devices arranged in a RAID array, the RAID array being configured to:
specify P target objects, P>1;
specify A target objects as spare space, A<P and A>1;
define a sub-matrix of P' columns, P'=P−A;
define a layout of stripe groups across the P' target objects in the sub-matrix, each stripe group comprising a plurality of data units and a plurality of parity units;
add A columns, representative of the A spare space target objects, to the sub-matrix to form a complete matrix defining the layout mapping function; and
implement the layout mapping function on the P target objects of the RAID array.

26. A non-transitory computer readable storage medium having stored thereon a computer program product executable by a programmable processing apparatus, comprising one or more software portions for performing the steps of claim 1.

* * * * *